United States Patent Office.

HENRY WURTZ, OF NEW YORK, N. Y., ASSIGNOR TO JAMES LORIMER GRAHAM, OF SAME PLACE.

Letters Patent No. 99,739, dated February 8, 1870.

IMPROVED COMPOSITION FOR MOULDINGS, PICTURE-FRAMES, &c.

The Schedule referred to in these Letters Patent and making part of the same.

*To all whom it may concern:*

Be it known that I, HENRY WURTZ, of New York, in the county of New York, in the State of New York, have invented a new and improved Mode of Making Composition Suitable for Ornamental Mouldings, for Frames of Pictures and Mirrors, and other uses; and I do hereby declare that the following is a full and exact description thereof.

Description.

The nature of my invention consists in making and using, either alone or in certain forms of composition, a certain mineral substance, found upon McFarland's run, in Ritchie county, West Virginia, which I call Grahamite, as a material for moulding by pressure or heat, or both, or otherwise, into any desired shape or form, or into any article of use or ornament.

In order to enable others to pratise and use my invention, I will proceed to describe my methods of preparation and operation.

First, raw Grahamite, being possessed of too little cohesion and fusibility to be used directly as a material for the uses specified, except within a narrow range of cases, is usually previously compounded with suitable proportions of other materials of a tarry, pitchy, asphaltic, resinous, or balsamic nature, thus forming cement compositions, such as are described in a patent already issued to the undersigned HENRY WURTZ, dated August 13, 1867, No. 67,696, for a new and improved mode of making compositions for making cements, &c. Such cement compositions are then intimately mixed with materials of a fibrous character, such as any sort of vegetable fibre, in a chopped or comminuted form, wood sawdust, paper-stock, &c., and pressed into moulds. Before admixture of the fibre the latter must be strongly dried or baked in an oven, to expel water, and thus prevent the formation of bubbles of steam in the mass when heated. The incorporation is accomplished either by first fusing the cement, and then stirring in the dried fibre, or better, (with some kinds of fibrous materials, wood sawdust, for example,) by first crushing the cement to a coarse powder, (at as low a temperature as practicable, in order that it may be sufficiently brittle,) then mixing it with the fibrous materials, heating the mixture, and moulding.

Second, similar compositions of far finer quality as regards cohesiveness and lustre, are made by me by using, alone or in combination with fibrous substances, (instead of raw Grahamite, or the fusible compositions thereof, with tarry or other materials above specified,) the peculiar resinoid constituent first extracted by me from Grahamite, (which forms the subject of a distinct application for a patent by me, pending at this date,) and which I call *alpha resinoid* of Grahamite or *viscosine*. *Viscosine* is obtained from Grahamite by digestion in rectified petroleum, petroleum-naphtha, or sulphuric ether, (as is more particularly specified in the application referred to,) and is sometimes preferably combined by me with the fibrous material, while it is itself in process of preparation, that is, during the separation of the solvent therefrom by evaporation, at that stage in the process at which the heated solution of *alpha resinoid* has about the consistence of tar.

After the incorporation, a continuance of the heat, (gradually and cautiously applied, to avoid the development of bubbles in the mass,) will, of course, expel the remainder of the solvent medium, and leave a composition of the fibrous matter with *viscosine* alone.

In certain cases in which cohesive strength and specific levity on the part of the composition are of minor consequence, I substitute, either wholly or partially, for the fibrous constituents in any of the above-described compositions, comminuted mineral matters, such as clays and earthy materials, metallic oxides, sulphates, or carbonates, &c.

With the *viscosine*, compositions possessing much strength may thus be made without the use of any fibre.

Claims.

What I claim as my invention, and desire to secure by Letters Patent, is—

1. The use, as materials for moulding by heat and pressure into any useful or ornamental form, of Grahamite and compositions thereof, with other substances.

2. The use, as materials for moulding by heat and pressure into any useful or ornamental form, of the constituents of Grahamite, called by me *alpha resinoid* of Grahamite, or *viscosine* extracted from Grahamite by solvents, as specified, either alone or in any form of composition with other substances.

In testimony whereof, I have hereunto set my signature, in the presence of two witnesses, in the city of New York, this 28th day of Sepember, 1867.

HENRY WURTZ.

Witnesses:
CHARLES A. SEELEY,
MICHAEL J. HAVILAND.